(12) United States Patent
Galor et al.

(10) Patent No.: US 9,829,988 B2
(45) Date of Patent: Nov. 28, 2017

(54) THREE DIMENSIONAL USER INTERFACE SESSION CONTROL USING DEPTH SENSORS

(71) Applicant: APPLE INC., Cupertino, CA (US)

(72) Inventors: Micha Galor, Tel Aviv (IL); Jonathan Pokrass, Bat Yam (IL); Amir Hoffnung, Tel Aviv (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/233,969

(22) Filed: Aug. 11, 2016

(65) Prior Publication Data

US 2016/0349853 A1 Dec. 1, 2016

Related U.S. Application Data

(63) Continuation of application No. 14/714,297, filed on May 17, 2015, now Pat. No. 9,417,706, which is a continuation of application No. 14/055,997, filed on Oct. 17, 2013, now Pat. No. 9,035,876, which is a continuation-in-part of application No. 13/314,210, filed on Dec. 8, 2011, now Pat. No. 8,933,876, said application No. 14/714,297 is a continuation-in-part of application No. 13/423,314, filed on Mar. 19, 2012, now abandoned, which is a continuation-in-part of application No. 12/352,622, filed on Jan. 13, 2009, now Pat. No. 8,166,421.

(60) Provisional application No. 61/422,239, filed on Dec. 13, 2010, provisional application No. 61/020,754, filed on Jan. 14, 2008, provisional application No.
(Continued)

(51) Int. Cl.
*G06F 3/01* (2006.01)
*G06F 3/00* (2006.01)
*G06F 3/03* (2006.01)
*G06F 3/0481* (2013.01)

(52) U.S. Cl.
CPC .............. *G06F 3/017* (2013.01); *G06F 3/005* (2013.01); *G06F 3/011* (2013.01); *G06F 3/0304* (2013.01); *G06F 3/04815* (2013.01)

(58) Field of Classification Search
CPC ................................. G06F 3/011; G06F 3/017
USPC ........................... 345/156–158; 715/700–866
See application file for complete search history.

(56) References Cited

U.S. PATENT DOCUMENTS 7,263,668 B1 8/2007 Lentz
7,433,024 B2 10/2008 Garcia et al.
(Continued)

FOREIGN PATENT DOCUMENTS

IL WO 2007105205 A2 * 9/2007 ............. G01B 11/25

OTHER PUBLICATIONS

U.S. Appl. No. 14/485,840 Office Action dated Jun. 16, 2017.
U.S. Appl. No. 15/919,751 Office Action dated Aug. 11, 2017.

*Primary Examiner* — Michael Pervan
(74) *Attorney, Agent, or Firm* — D.Kligler IP Services Ltd.

(57) ABSTRACT

A method, including receiving, by a computer executing a non-tactile three dimensional (3D) user interface, a set of multiple 3D coordinates representing a gesture by a hand positioned within a field of view of a sensing device coupled to the computer, the gesture including a first motion in a first direction along a selected axis in space, followed by a second motion in a second direction, opposite to the first direction, along the selected axis. Upon detecting completion of the gesture, the non-tactile 3D user interface is transitioned from a first state to a second state.

15 Claims, 5 Drawing Sheets

Related U.S. Application Data

61/020,756, filed on Jan. 14, 2008, provisional application No. 61/032,158, filed on Feb. 28, 2008.

(56) References Cited

U.S. PATENT DOCUMENTS

| | | |
|---|---|---|
| 9,504,920 B2 | 11/2016 | Kareemi et al. |
| 9,600,078 B2 | 3/2017 | Rafii et al. |
| 9,619,105 B1 | 4/2017 | Dal Mutto et al. |
| 2004/0222977 A1* | 11/2004 | Bear .................. G06F 11/328 345/184 |
| 2007/0192794 A1 | 8/2007 | Curtis et al. |
| 2007/0211022 A1* | 9/2007 | Boillot ................ G06F 3/0325 345/156 |
| 2010/0137063 A1 | 6/2010 | Shirakawa et al. |
| 2010/0302145 A1 | 12/2010 | Langridge et al. |
| 2011/0161890 A1 | 6/2011 | Anderson et al. |
| 2011/0175822 A1 | 7/2011 | Poon et al. |
| 2012/0182226 A1* | 7/2012 | Tuli .................... G06F 3/04883 345/173 |
| 2012/0229377 A1 | 9/2012 | Kim et al. |

\* cited by examiner

THREE DIMENSIONAL USER INTERFACE SESSION CONTROL USING DEPTH SENSORS

CROSS-REFERENCE TO RELATED APPLICATIONS

This application is a continuation of U.S. patent application Ser. No. 14/714,297, filed May 17, 2015, which is a continuation of U.S. patent application Ser. No. 14/055,997, filed Oct. 17, 2013 (now U.S. Pat. No. 9,035,876), which is a continuation-in-part of U.S. patent application Ser. No. 13/314,210, filed Dec. 8, 2011 (now U.S. Pat. No. 8,933,876), which claims the benefit of U.S. Provisional Patent Application 61/422,239, filed Dec. 13, 2010. The above-mentioned U.S. patent application Ser. No. 14/714,297 is also a continuation-in-part of U.S. patent application Ser. No. 13/423,314, filed Mar. 19, 2012, which is a continuation-in-part of U.S. patent application Ser. No. 12/352,622, filed Jan. 13, 2009 (now U.S. Pat. No. 8,166,421), which claims the benefit of U.S. Provisional Patent Application 61/020,754, filed Jan. 14, 2008; U.S. Provisional Patent Application 61/020,756, filed Jan. 14, 2008; and U.S. Provisional Patent Application 61/032,158, filed Feb. 28, 2008. All of the above related applications are incorporated herein by reference.

FIELD OF THE INVENTION

This invention relates generally to user interfaces for computerized systems, and specifically to user interfaces that are based on three-dimensional sensing.

BACKGROUND OF THE INVENTION

Many different types of user interface devices and methods are currently available. Common tactile interface devices include the computer keyboard, mouse and joystick. Touch screens detect the presence and location of a touch by a finger or other object within the display area. Infrared remote controls are widely used, and "wearable" hardware devices have been developed, as well, for purposes of remote control.

Computer interfaces based on three-dimensional (3D) sensing of parts of the user's body have also been proposed. For example, PCT International Publication WO 03/071410, whose disclosure is incorporated herein by reference, describes a gesture recognition system using depth-perceptive sensors. A 3D sensor provides position information, which is used to identify gestures created by a body part of interest. The gestures are recognized based on a shape of a body part and its position and orientation over an interval. The gesture is classified for determining an input into a related electronic device.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method, including receiving, by a computer executing a non-tactile three dimensional (3D) user interface, a set of multiple 3D coordinates representing a gesture by a hand positioned within a field of view of a sensing device coupled to the computer, the gesture including a first motion in a first direction along a selected axis in space, followed by a second motion in a second direction, opposite to the first direction, along the selected axis, and transitioning the non-tactile 3D user interface from a first state to a second state upon detecting completion of the gesture.

There is also provided, in accordance with an embodiment of the present invention a method, including receiving, by a computer executing a non-tactile three dimensional (3D) user interface, a set of multiple 3D coordinates representing a gesture by a hand positioned within a field of view of a sensing device coupled to the computer, the gesture including a rising motion along a vertical axis in space, and transitioning the non-tactile 3D user interface from a locked state to an unlocked state upon detecting completion of the gesture.

There is additionally provided, in accordance with an embodiment of the present invention a method, including associating, in a computer executing a non-tactile three dimensional (3D) user interface, multiple regions, including at least first and second regions, within a field of view of a sensing device coupled to the computer with respective states of the non-tactile 3D user interface, including at least first and second states associated respectively with the first and second regions, receiving a set of multiple 3D coordinates representing a hand movement from the first region to the second region, and responsively to the movement, transitioning the non-tactile 3D user interface from the first state to the second state.

There is further provided, in accordance with an embodiment of the present invention an apparatus, including a three dimensional (3D) optical sensor having a field of view and coupled to a computer executing a non-tactile three dimensional (3D) user interface, and an illumination element that when illuminated, is configured to be visible to a user when the user is positioned within the field of view.

There is additionally provided, in accordance with an embodiment of the present invention an apparatus, including a sensing device, and a computer executing a non-tactile three dimensional (3D) user interface and configured to receive, from the sensing device, a set of multiple 3D coordinates representing a gesture by a hand positioned within a field of view of the sensing device, the gesture including a first motion in a first direction along a selected axis in space, followed by a second motion in a second direction, opposite to the first direction, along the selected axis, and to transition the non-tactile 3D user interface from a first state to a second state upon detecting completion of the gesture.

There is also provided, in accordance with an embodiment of the present invention an apparatus, including a sensing device, and a computer executing a non-tactile three dimensional (3D) user interface and configured to receive, from the sensing device, a set of multiple 3D coordinates representing a gesture by a hand positioned within a field of view of the sensing device, the gesture including a rising motion along a vertical axis in space, and to transition the non-tactile 3D user interface from a locked state to an unlocked state upon detecting completion of the gesture.

There is alternatively provided, in accordance with an embodiment of the present invention an apparatus, including a sensing device, and a computer executing a non-tactile three dimensional (3D) user interface and configured to associate multiple regions, including at least first and second regions, within a field of view of the sensing device with respective states of the non-tactile 3D user interface, including at least first and second states associated respectively with the first and second regions, to receive a set of multiple 3D coordinates representing a hand movement from the first region to the second region, and responsively to the movement, to transition the non-tactile 3D user interface from the first state to the second state.

There is also provided, in accordance with an embodiment of the present invention a computer software product including a non-transitory computer-readable medium, in which program instructions are stored, which instructions, when read by a computer executing a non-tactile user interface, cause the computer to receive, from a sensing device, a set of multiple 3D coordinates representing a gesture by a hand positioned within a field of view of the sensing device, the gesture including a first motion in a first direction along a selected axis in space, followed by a second motion in a second direction, opposite to the first direction, along the selected axis, and to transition the non-tactile 3D user interface from a first state to a second state upon detecting completion of the gesture.

There is additionally provided, in accordance with an embodiment of the present invention a computer software product including a non-transitory computer-readable medium, in which program instructions are stored, which instructions, when read by a computer executing a non-tactile user interface, cause the computer to receive, from a sensing device, a set of multiple 3D coordinates representing a gesture by a hand positioned within a field of view of the sensing device, the gesture including a rising motion along a vertical axis in space, and to transition the non-tactile 3D user interface from a locked state to an unlocked state upon detecting completion of the gesture.

There is further provided, in accordance with an embodiment of the present invention a computer software product including a non-transitory computer-readable medium, in which program instructions are stored, which instructions, when read by a computer executing a non-tactile user interface, cause the computer to associate multiple regions, including at least first and second regions, within a field of view of a sensing device with respective states of the non-tactile 3D user interface, including at least first and second states associated respectively with the first and second regions, to receiving a set of multiple 3D coordinates representing a hand movement from the first region to the second region, and responsively to the movement, to transition the non-tactile 3D user interface from the first state to the second state.

BRIEF DESCRIPTION OF THE DRAWINGS

The disclosure is herein described, by way of example only, with reference to the accompanying drawings, wherein.

DETAILED DESCRIPTION OF EMBODIMENTS

When using physical tactile input devices such as buttons, rollers or touch screens, a user typically engages and disengages control of a user interface by touching and/or manipulating the physical device. Embodiments of the present invention describe gestures for engaging and disengaging control of a user interface based on three-dimensional (3D) sensing (referred to herein as a non-tactile 3D user interface), by a 3D sensor, of motion or change of position of one or more body parts, typically a hand, of the user. Gestures described herein include focus gestures and unlock gestures. A focus gesture enables the user to engage (i.e., take control of) an inactive non-tactile 3D user interface. An unlock gesture enables the user to engage a locked non-tactile 3D user interface, as pressing a specific sequence of keys unlocks a locked cellular phone. In some embodiments, the non-tactile 3D user interface conveys visual feedback to the user performing the focus and the unlock gestures.

Embodiments of the present invention also describe methods for conveying visual feedback to the user, when the user's hand disengages from the non-tactile 3D user interface. The visual feedback typically alerts the user in an unobtrusive manner, thereby enhancing the user's experience.

As described supra, a 3D sensor captures 3D information regarding an object, typically a body part such as a hand, in an interactive area located in front of a display screen. Since the 3D sensor typically has a fixed field of view, a computer can track and accept inputs from the user when the body part is positioned within the field of view. Embodiments of the present invention describe methods and systems for conveying visual feedback to the user when the body part is within the field of view, outside the field of view, and when the user is at the periphery of the field of view.

System Description

Figure 1:
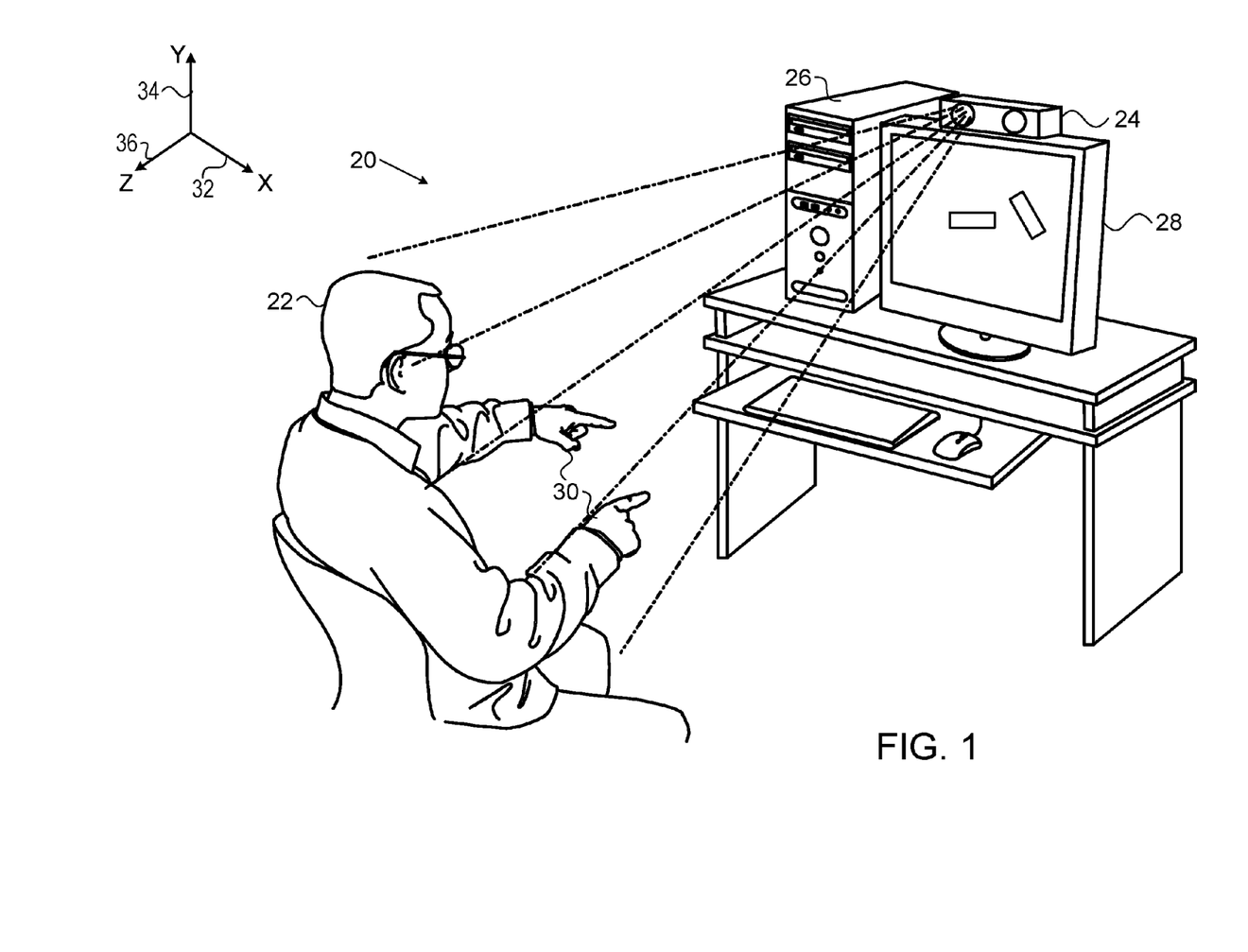
FIG. 1 is a schematic, pictorial illustration of a non-tactile 3D user interface for a computer system, in accordance with an embodiment of the present invention.

FIG. 1 is a schematic, pictorial illustration of a non-tactile 3D user interface 20 (also referred to herein as the user interface) for operation by a user 22 of a computer 26, in accordance with an embodiment of the present invention. The non-tactile 3D user interface is based on a 3D sensing device 24 coupled to the computer, which captures 3D scene information of a scene that includes the body (or at least a body part, such as one or more of hands 30) of the user. Device 24 or a separate camera (not shown in the figures) may also capture video images of the scene. The information captured by device 24 is processed by computer 26, which drives a display 28 accordingly.

Computer 26, executing 3D user interface 20, processes data generated by device 24 in order to reconstruct a 3D map of user 22. The term "3D map" refers to a set of 3D coordinates measured, by way of example, with reference to a generally horizontal X-axis 32 in space, a generally vertical Y-axis 34 in space and a depth Z-axis 36 in space, based on device 24. The 3D coordinates represent the surface of a given object, in this case the user's body. In one embodiment, device 24 projects a pattern of spots onto the object and captures an image of the projected pattern. Computer 26 then computes the 3D coordinates of points on the surface of the user's body by triangulation, based on transverse shifts of the spots in the pattern. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, interface 20 may use other methods of 3D mapping, using single or multiple cameras or other types of sensors, as are known in the art.

Computer 26 typically comprises a general-purpose computer processor, which is programmed in software to carry out the functions described hereinbelow. The software may be downloaded to the processor in electronic form, over a network, for example, or it may alternatively be provided on non-transitory tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although computer 26 is shown in FIG. 1, by way of example, as a separate unit from sensing device 24, some or all of the processing functions of the computer may be performed by suitable dedicated circuitry within the housing of the sensing device or otherwise associated with the sensing device.

As another alternative, these processing functions may be carried out by a suitable processor that is integrated with display 28 (in a television set, for example) or with any other suitable sort of computerized device, such as a game console or media player. The sensing functions of device 24 may likewise be integrated into the computer or other computerized apparatus that is to be controlled by the sensor output.

Focus Gestures

In the embodiments described herein, user interface 20 comprises the following individual states:

Unlocked/Locked. While locked, user interface 20 typically ignores all gestures except for an unlock gesture (described hereinbelow) that transitions the non-tactile 3D user interface to an unlocked state. When unlocked, gestures, such as those from hand 30, can interact with user interface 20.

Tracked/Not-tracked. In embodiments of the present invention, tracking refers to user interface 20 focusing on a specific body part of an individual in order for the user to interact with the non-tactile 3D user interface. When user interface 20 is in the tracked state, the non-tactile 3D user interface can track and interpret gestures from the specific body part, e.g., hand 30. While in the not-tracked state, the non-tactile 3D user interface is not focusing on any specific individual or body part.

Active/Inactive. User interface 20 is active when the user interface is unlocked, engaged with and tracking user 22 and able to accept gestures from the user. When user 22 is disengaged from user interface 20, the non-tactile 3D user interface is inactive.

In embodiments of the present invention, the state of user interface 20 typically comprises a combination of the states described supra. The states of user interface 20 may include:

Tracked, Unlocked and Active.
Tracked, Unlocked and Inactive.
Not-Tracked, Unlocked and Inactive.
Not-Tracked, Locked and Inactive.
Tracked, Locked and Inactive.

Figure 7:
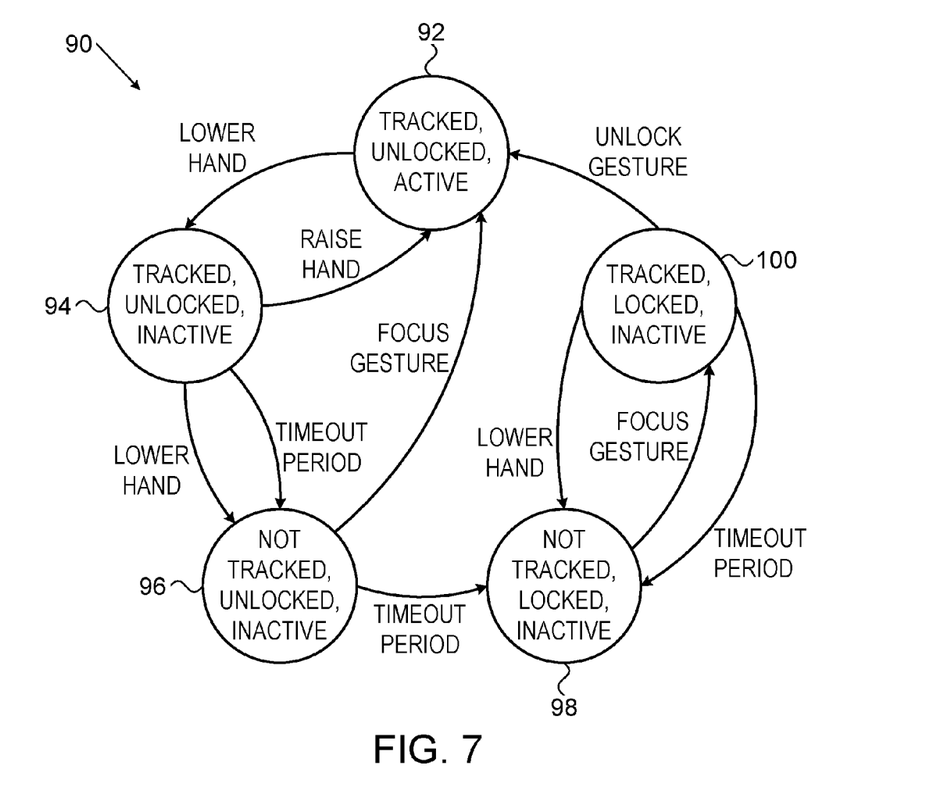
FIG. 7 is a state diagram that schematically illustrates states of the non-tactile 3D user interface, in accordance with embodiments of the present invention.

A state diagram detailing the transitions between the states of 3D user interface 20 is shown in FIG. 7, described hereinbelow.

To engage 3D user interface 20 while positioned in a field of view of sensing device 24, user 22 may perform a focus gesture. A well-designed focus gesture typically strikes a balance between ease of use and a low instance of false positives (i.e., a physical gesture that the computer incorrectly identifies as a focus gesture). On the one hand, a simple focus gesture (for example, pointing an index finger) may be easy to learn, but may be prone to generating excessive false positives. On the other hand, a complex focus gesture may generate few false positives, but may also be difficult for the user to learn. Typically, a well-designed focus gesture has a false positive rate of less than 2%.

A focus gesture comprising multiple physical motions can be broken down into a series of steps performed in a specific sequence. In some embodiments, computer 26 conveys feedback to user 22 during and/or upon completion of each of the steps. The focus gesture steps should typically be distinct enough so as not to interfere with the operation of user interface 20 (i.e., by generating false positives). For example, if user interface 20 is configured to show movies from a movie library stored on the computer, the focus gesture steps should be sufficiently different from the gestures used to control the movie library (e.g., gestures that select and control playback of a movie).

A focus gesture, used to engage user interface 20, may include a "push" gesture or a "wave" gesture. As described in detail hereinbelow, the focus gesture may comprise user 22 performing, with hand 30, a first motion in a first direction along a selected axis (in space), followed a second motion in a second direction, opposite to the first direction, along the selected axis. In some embodiments, computer 26 conveys visual feedback to user 22 as the user performs and/or completes each step of the focus gesture. The feedback can help train user 22 to perform the focus gesture correctly.

Figure 2:
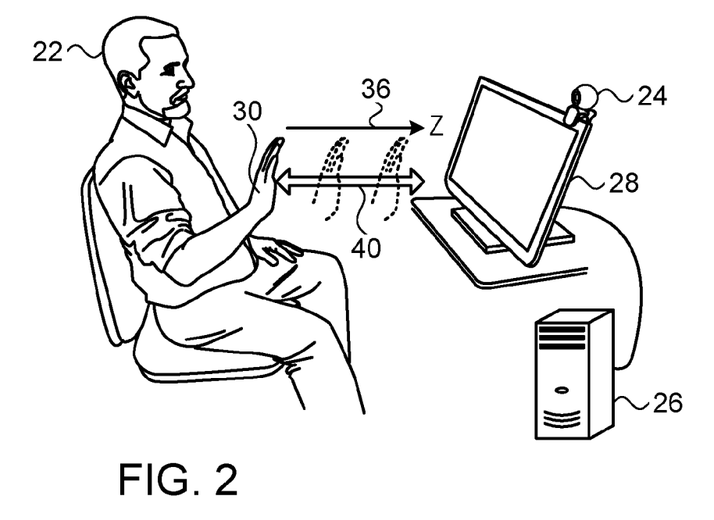
FIG. 2 is a schematic pictorial illustration of a user performing a push gesture, in accordance with an embodiment of the present invention.

FIG. 2 is a schematic pictorial illustration of user 22 performing a push gesture, in accordance with an embodiment of the present invention. The push gesture comprises user 22 performing a combination of the following:

A first motion comprising pushing hand 30 forward (i.e., towards display 28) at a minimum focus gesture speed and for at least a focus gesture distance along Z-axis 36.

A second motion comprising pulling hand 30 back (i.e., towards user 22) at a minimum focus gesture speed and for at least a focus gesture distance along Z-axis 36.

For example, the minimum focus gesture speed and the focus gesture distance may comprise 10 centimeters per second, and 10 centimeters, respectively. The forward and backward motions of the push gesture are indicated by arrows 40. As user 22 moves hand 30 along Z-axis 36, computer 26 receives, from sensing device 24, a set of multiple 3D coordinates representing the forward and backward motion of the hand (i.e., the push gesture). Upon detecting completion of the push gesture, computer 26 can transition user interface 20 from a first state (e.g., not tracked) to a second state (e.g., tracked).

Figure 3:
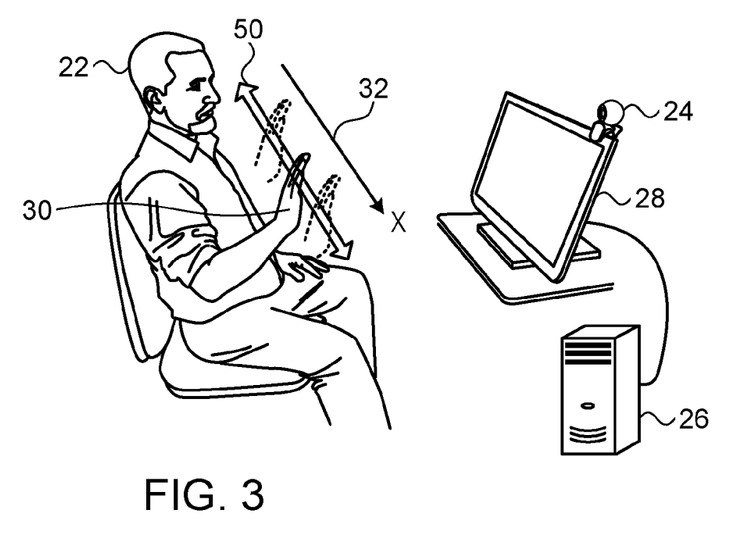
FIG. 3 is a schematic pictorial illustration of the user performing a wave gesture, in accordance with an embodiment of the present invention.

FIG. 3 is a schematic pictorial illustration of user 22 performing a wave gesture, in accordance with an embodiment of the present invention. The wave gesture comprises user 22 performing a combination of the following:

A first gesture comprising moving hand 30 in a swiping motion from a first side to a second side (i.e., either left-to-right right-to-left) at the minimum focus gesture speed, and for at least the focus gesture distance along X-axis 32.

A second gesture comprising moving hand 30 in a swiping motion from the second side to the first side at the minimum focus gesture speed, and for at least the focus gesture distance along X-axis 32.

The side-to-side swiping motions of the wave gesture are indicated by arrows 50. As user 22 moves hand 30 along X-axis 32, computer 26 receives, from sensing device 24, a set of multiple 3D coordinates representing the side-to-side motion of the hand (i.e., the wave gesture). Upon detecting completion of the wave gesture, computer 26 can transition user interface 20 from a first state (e.g., not tracked) to a second state (e.g., tracked).

Figure 4:
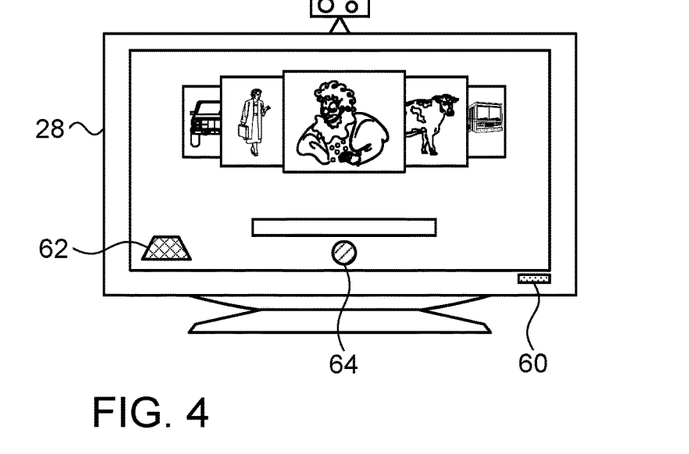
FIG. 4 is a schematic pictorial illustration of a computer conveying visual feedback to the user, as the user performs a focus gesture, in accordance with an embodiment of the present invention.

FIG. 4 is a schematic pictorial illustration of computer (i.e., via display 28) conveying visual feedback to user 22, as the user performs a focus gesture, in accordance with an embodiment of the present invention. In some embodiments, computer 26 may control a visual feedback device 60 coupled to display 28 and computer 26, such as a light emitting diode (LED) that may change color as user 22 performs the focus gesture.

The visual feedback may comprise a first visual feedback prior to the first gesture of the focus gesture, a second visual feedback subsequent to the first gesture, and a third visual feedback subsequent to the second gesture of the focus gesture. For example, prior to performing the focus gesture, user interface 20 can illuminate LED 60 in a first color, e.g., red. After user 22 performs the first gesture of the focus gesture (e.g., by pushing hand 30 towards sensing device 24 to initiate the push gesture or by swiping the hand from a first side to a second side to initiate the wave gesture), computer 26 can illuminate LED 60 in a second color, e.g., orange. Finally, after user 22 completes the second gesture of the focus gesture (e.g., by pulling hand 30 back from sensing device 24 to complete the push gesture or by swiping the hand back from the second side to the first side to complete the wave gesture), the computer can illuminate LED 60 in a third color, e.g., green, and engage user 22 with user interface 20.

In an additional embodiment, visual feedback device 60 may comprise a single color LED that blinks (i.e., illuminates and darkens) as user 22 performs a focus gesture. During periods between focus gestures, the single LED may be either constantly illuminated or darkened. In an alternative embodiment, visual feedback device 60 may comprise multiple LEDs that convey visual feedback to user 22 before, during and after performing the focus gesture (e.g., separate red, yellow and green LEDs as in a traffic light).

In a further embodiment, visual feedback device 60 may comprise a vertical or a circular array of LEDs. When user interface 20 is inactive, computer 26 darkens the LEDs. As user performs the focus gesture, computer 26 can illuminate an additional LED with each individual gesture (e.g., the side-to-side swipe of hand 30 for the wave gesture or the forward and backward motion of hand 30 for the push gesture). After user 22 completes the focus gesture, computer 26 can illuminate all the LEDs.

In still yet another embodiment, visual feedback device 60 may comprise a horizontal array of LEDs. When user interface 20 is disengaged, computer 26 can illuminate a single LED in the horizontal array. As user 22 performs the focus gesture, computer 26 can toggle the LEDs in the horizontal array to mimic the motion of hand 30.

Additionally or alternatively, computer 26 may alter a feedback item presented on display 28 while user 22 performs the focus gesture. For example, the feedback item may comprise a status icon 62 that either changes its appearance or displays an animation (e.g., a triangular shape within the icon that alters shape) during the focus gesture.

In alternative embodiments, the feedback item may comprise a circle 64 on display 28, and computer 26 can change the size of the feedback item depending on the location of hand 30 during the focus gesture. For example, as user 22 moves hand 30 closer to sensing device 24 to initiate a push gesture, computer 26 may increase the diameter of circle 64, or vice versa. Visual feedback conveyed by computer 26 may also include an indication as to the speed of the gesture (i.e. whether user 22 is moving hand 30 at an appropriate speed or not), and/or an indication when the hand has moved a sufficient distance to complete one of the focus gesture steps.

In further embodiments, the feedback may comprise a text message presented on display 28. For example, after user 22 performs the first gesture of the push gesture (i.e., moving hand 30 forward), computer 26 can present a text message such as "Pull hand back to gain control".

Unlock Gesture

In embodiments of the invention, states of 3D user interface 20 may include the locked and the unlocked states. The user interface may transition to the locked state either automatically after a defined period of inactivity, or after user 22 explicitly performs a lock gesture. While in the locked state, user 22 is disengaged from user interface 20. In some embodiments, user 22 performs the focus gesture followed by an unlock gesture, thereby unlocking and engaging user interface 20.

Alternatively, user interface 20 may implement a spatial aware gesture lock, where the state of the user interface may be unlocked for a specific region including user 22, but locked for other regions in proximity to the specific region (and therefore locked for any individuals in the other regions).

Examples of unlock gestures include an "up" gesture (e.g., raising hand 30 a specified distance), a sequence of two sequential wave gestures, and a sequence of two sequential push gestures, as described in detail hereinbelow.

Figure 5:
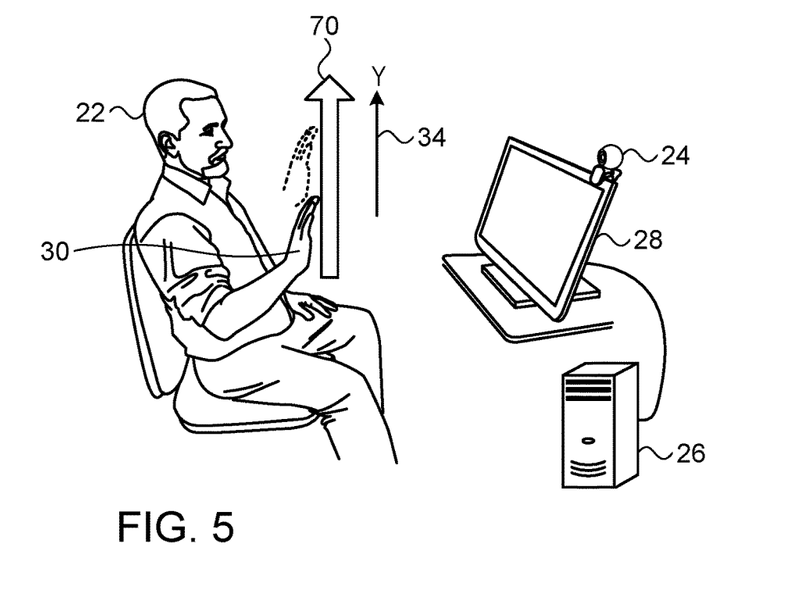
FIG. 5 is a schematic pictorial illustration of the user performing an up gesture, in accordance with an embodiment of the present invention.

FIG. 5 is a schematic pictorial illustration of user 22 performing an up gesture, in accordance with an embodiment of the present invention. The up gesture comprises user 22 raising hand 30 vertically, at a minimum unlock gesture speed, and for at least an unlock gesture distance along Y-axis 34, as indicated by arrow 70. For example, the minimum unlock gesture speed and the unlock gesture distance (i.e., for an unlock gesture such as the up gesture) map comprise four centimeters per second, and 20 centimeters, respectively.

As user 22 elevates hand 30 along Y-axis 34, computer 26 receives, from sensing device 24, a set of multiple 3D coordinates representing the rising motion of the hand (i.e., the up gesture). Upon detecting completion of the up gesture, computer 26 can transition user interface 20 from a locked state to an unlocked state.

While locked, the state of user interface 20 is typically not-tracked, locked and inactive. To unlock user interface 20, user 22 typically first performs a focus gesture, which transitions user interface 20 to the tracked, locked and inactive state. Upon detecting the focus gesture, computer 26 may convey feedback (either on display 28 or on device 60) prompting user 22 to elevate hand 30 to unlock the user interface (i.e., to perform the unlock gesture). Performing the unlock gesture engages the user interface, and transitions user interface 20 to the tracked, unlocked and active state.

As described supra, user 22 can unlock user interface 20 by performing two focus gestures sequentially. After detecting the first focus gesture, computer 26 transitions user interface 20 from the not-tracked, locked and inactive state to the tracked, locked and inactive state, and after detecting the second focus gesture, the computer transitions the non-tactile 3D user interface to the tracked, unlocked and active state. Thus, for example, unlocking user interface 20 may comprise user 22 performing either two wave gestures, two push gestures, or a combination of the two.

Computer 26 may also convey a first visual feedback to the user performing the unlock gesture, and a second visual feedback subsequent to the user performing the unlock gesture. For example, visual feedback device 60 may comprise a red LED that illuminates when user interface 20 is the locked state, and a green LED that illuminates when the user interface is in the unlocked state. In an alternative embodiment, visual feedback device 60 may comprise a multi-colored LED that changes color upon computer 26 transitioning user interface 20 to either the locked or the unlocked state.

In an additional embodiment, computer 26 may convey visual feedback via a feedback item presented on display 28. For example, the feedback item may comprise an icon 62 that is configured to show either a closed padlock or a closed eye when user interface 20 is in the locked state, and either an open padlock or an open eye when the user interface is the unlocked state.

Dropping Sessions

As hand 30 interacts with 3D user interface 20, the position of the hand may influence the state of the non-tactile 3D user interface. For example, if user 22 drops hand 30 to the user's lap, then the user may disengage from the non-tactile 3D user interface, with computer 26 transitioning user interface 20 from the tracked, active and unlocked state to the not-tracked, inactive and unlocked state. Upon detecting user 22 performing a focus gesture, computer 26 can transition user interface 20 back to the tracked, active and unlocked state, and reengages the user interface.

FIGS. 6A, 6B, 6C, and 6D are schematic pictorial illustrations of user interface 20 responding to vertical movement of hand 30, in accordance with an embodiment of the present invention. In the example shown in FIG. 6A, hand 30 can move between an active region 80, a pre-drop region 84 and dropped region 86, where each of the regions is associated with a state of 3D user interface 20. As shown in the figure, active region 80 is associated with a tracked and active state, pre-drop region 84 is associated with a tracked and inactive state, and dropped region 86 is associated with a not tracked and inactive state.

Figure 6A:
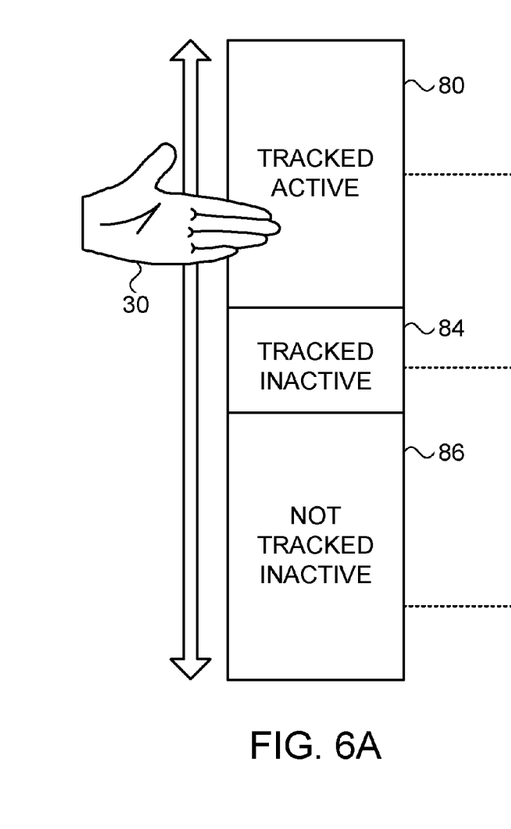
FIGS. 6A, 6B, 6C, and 6D are schematic pictorial illustrations of the non-tactile 3D user interface responding to vertical movement of the user's hand, in accordance with an embodiment of the present invention.

In operation, computer 26 defines multiple regions comprising at least a first region and a second region within a field of view of sensing device 24, and associates each of the defined regions with a state of user interface 20. As user 22 moves hand 30 from the first region (e.g., region 80) to the second region (e.g., region 82), computer 26 receives a set of multiple 3D coordinates representing the hand moving from the first region to the second region. Upon detecting hand 30 moving from the first region to the second region, computer 26 responsively transitions 3D user interface 20 from the state associated with the first region to the state associated with the second region.

Figure 6B:
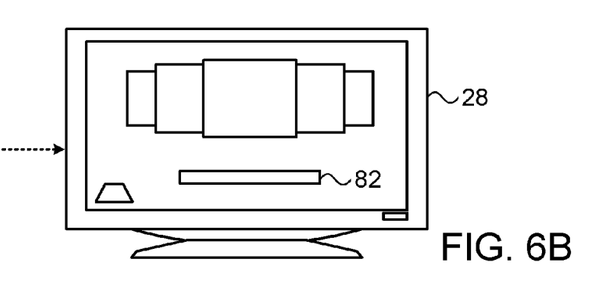

While hand 30 is within active region 80, user interface 20 may respond to gestures performed by the hand, as the state of the 3D user interface is tracked, active and unlocked. In some embodiments, computer 26 may convey visual feedback to user 22 indicating a current state of 3D user interface 20. For example, while positioned within region 80, hand 30 may interact with user interface 20 via a softbar 82, as shown in FIG. 6B. Softbar 82 may also be referred to a horizontal bar user interface. While hand 30 interacts with softbar 82, computer 26 may position the softbar at a fixed location on display 28. A non-tactile 3D user interface incorporating softbar 82 is described, for example, in U.S. patent application Ser. No. 13/161,508, filed Jun. 16, 2011, whose disclosure is incorporated herein by reference.

If user 22 lowers hand 30 from region 80 to pre-drop region 84, computer 26 transitions the state of user interface 20 to the tracked, inactive and unlocked state. While hand 30 is in region 84, the hand is disengaged from user interface 20 (i.e., the non-tactile 3D user interface may ignore gestures from the hand), but the non-tactile 3D user interface is still tracking the hand.

Figure 6C:
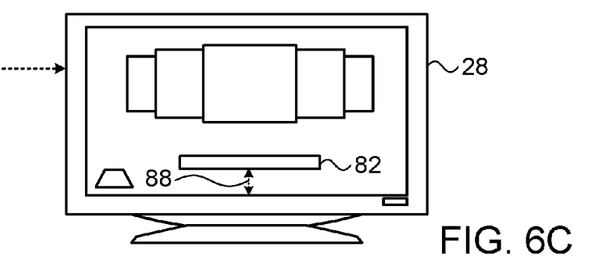
Figure 6D:
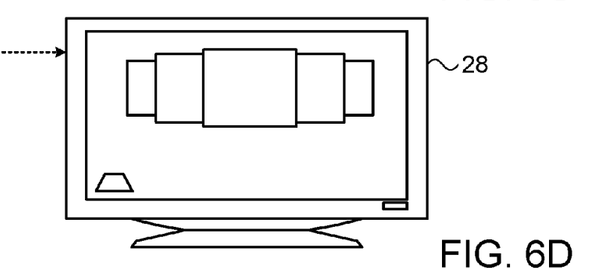

In some embodiments, while hand 30 is within region 84, computer 26 moves the vertical position of softbar 82 in synchronization with the hand, as indicated by arrows 88 in FIG. 6C. The vertical movement of softbar 82 conveys a "gentle" feedback to user 22 indicating a potential disengagement from user interface 20, should the user move hand 30 down to dropped region 86. If user 22 lowers hand 30 into region 86, computer 26 may not present softbar 82 (as shown in FIG. 6D), and the computer transitions the 3D user interface to the not-tracked, inactive and unlocked state.

To reengage user interface 20 while hand 30 is within region 84, user 22 can elevate the hand back to region 80, and computer 26 transitions the non-tactile 3D user interface back to the tracked, active and unlocked state. However, since the state of user interface 20 is not-tracked, inactive and unlocked while hand 30 is within region 86, the user may be required to perform a focus gesture in order to reengage the 3D user interface.

In some embodiments, active region 80 comprises a static region whose mid-point has a vertical coordinate where user 22 performed the focus gesture, thereby engaging user interface 20. In alternative embodiments, computer 26 may adjust boundaries of the regions responsively to recent movements of hand 30. For example, computer 26 may employ temporal filtering (or another similar algorithm) to update the mid-point, by periodically averaging the vertical coordinates of hand 30 when the hand performed recent gestures. By updating the mid-point, computer may also update the upper and lower boundaries of active region 80. Computer 26 can also use temporal filtering to assist in defining a horizontal (i.e., a side-to-side) active zone (not shown).

In some instances, hand 30 may engage user interface 20, but user 22 may be physically unable to lower the hand to pre-drop region 84. For example, user 22 may be sitting on a couch with hand 30 resting on an armrest. In response, computer 26 may "compress" regions 80, 84 and 86, thereby repositioning pre-drop region 84 to an appropriate (i.e., a reachable) level. Alternatively, computer 26 may present feedback, prompting user 22 to elevate hand 30 in order to engage the non-tactile 3D user interface. For example, computer 26 may only present the top half of softbar 82 at the bottom of display 28, thereby prompting the user to elevate hand 30 to a higher vertical position (at which point the softbar may be displayed in its entirety).

FIG. 7 is a state diagram 90 that schematically illustrates the states and the transitions of user interface 20, in accordance with embodiments of the present invention. When user 22 positions hand 30 in active region 80 and interacts with user interface 20, computer 26 sets the state the non-tactile 3D user interface to a tracked, unlocked and active state 92. Upon user 22 lowering hand 30 to pre-drop region 84, computer 26 disengages the hand from user interface 20, and the computer transitions the non-tactile 3D user interface from state 92 to a tracked, unlocked and inactive state 94. While in state 94, computer 26 still tracks hand 30, but may not accept any commands from the hand. Computer 26 transitions user interface back to state 92, responsively to detecting that user 2 elevates hand 30 back to active region 80.

If user 22 lowers hand 30 from pre-drop region 84 to dropped region 86, computer 26 transitions user interface 20 from state 94 to a not-tracked, unlocked and inactive state 96. In some embodiments, computer 26 may activate a first time-out timer upon transitioning user interface 20 to state 94. If user 22 does not elevate hand 30 back to region 80 during a first specified (time) period, computer 26 transitions user interface 20 to state 96.

Computer 26 transitions user interface 20 from state 96 back to state 92 responsively to detecting user 22 performing a focus gesture as described supra. Upon transitioning to state 96, computer 26 activates a second time-out timer. If computer does not detect a focus gesture within a second specified period (e.g., ten seconds), then the computer transitions user interface 20 from state 96 to a not-tracked, locked and inactive state 98.

Computer 26 transitions user interface 20 from state 98 to state 92 (i.e., unlocking and reengaging the user interface) upon detecting user 22 performing a focus gesture, followed by an unlock gesture. Upon detecting user 22 performing the focus gesture, computer 26 transitions user interface 20 from state 98 to a tracked, locked and inactive state 100. When computer 26 transitions user interface 20 to state 100, the computer activates a third timeout timer. If computer 26 detects user 22 either moving hand 30 from active region 80 (the hand is within region 80 when performing the focus gesture) or not performing a focus gesture within a third specified period, then the computer transition user interface 20 from state 100 back to state 98. Finally, if user 22 performs an unlock gesture within the second specified period of time, then computer 26 transitions user interface 20 from state 100 to state 92.

Field of View

Figure 8:
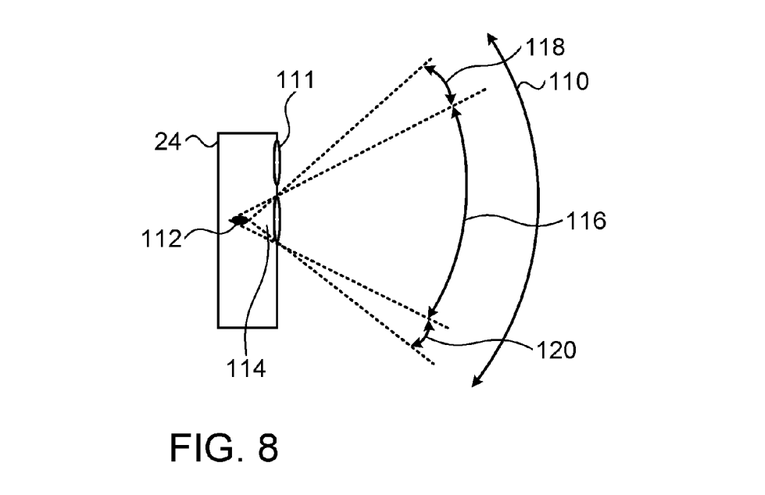
FIG. 8 is a schematic, pictorial illustration showing a sensing device configured to convey visual feedback to the user indicating the user's position relative to a field of view of the sensing device, in accordance with an embodiment of the present invention.

FIG. 8 is a schematic, pictorial illustration showing 3D sensing device 24 configured to convey visual feedback to user indicating the user's position relative to a field of view 110 of the 3D sensing device, in accordance with an embodiment of the present invention. Field of view 110 defines the volume of space that sensing device 24 can "see". 3D sensing device 24 comprises a 3D optical sensor 111 and an illumination element 112 that is configured to convey visual feedback to user 22 indicating when the user is located within field of view 110.

In the example shown in FIG. 8, illumination element 112 comprises a single light emitting diode (LED) positioned in proximity to an apex of a conical shaft 114, and where the LED is in proximity to optical sensor 111. Typically, when user 22 is within field of view 110, the user can see the LED.

Field of view 110 comprises a central field of view 116 bounded by peripheral fields of view 118 and 120. In some embodiments, user 22 sees the entire illumination element (e.g., a circle) when the user is within central field of view 116. As user 22 moves to periphery fields of view 118 or 120, the user may only see part of the illumination element (e.g., a semicircle). In other words, if user 22 can see any part of the illumination element, then optical sensor 111 can see the user.

In some embodiments, conical shaft 114 may include a customized slit (not shown), thereby enabling 3D sensing device 24 to present the illumination emanating from the illumination element as a specific shape (e.g., a company logo). In alternative embodiments, illumination element 112 may comprise multiple (e.g., three) LEDs positioned on 3D sensing device 24, where each of the multiple LEDs has a different field of view. When user 22 sees all the LEDs, the user is within field of view 110.

In an additional embodiment, illumination element 112 may be configured to convey visual feedback to user 22 indicating a current state of 3D user interface 20 to the user. In some embodiments, illumination element 112 may comprise multiple LEDs that are configured to present session indications (e.g., the state of user interface 20) to different individuals within field of view 110. For example, each of the multiple LEDs may comprise mechanical and/or optical elements that restrict each of the LEDs to different fields of view. Embodiments comprising multiple LEDs with different fields of view can also be used to convey feedback to multiple individuals within field of view 110.

In further embodiments, computer 26 may associate each state of user interface 20 with a specific color, and illumination element 112 may be configured to illuminate in different colors, based on the current state of the non-tactile 3D user interface. For example, while user interface 20 is in tracked, unlocked and active state 92 to user 22, computer 26 can illuminate illumination element 112 in green. Likewise, while user interface 20 is in tracked, unlocked and inactive state 94 to user 22, computer 26 can illuminate illumination element 112 in yellow, thereby conveying an indication to the user to raise hand 30 to region 80.

In still yet another embodiment, field of view 110 may comprise multiple regions (no shown), where additional users (not shown) in each region have a different state with user interface 20. For example, a first given user 22 positioned in a first given region can be in the locked state with 3D user interface 20, and a second given user 22 in a second given region can be in the active state with the non-tactile 3D user interface. Additionally, illumination element 112 can be configured to convey different visual feedback (e.g., different colors) to each of the regions, depending on their state with user interface 20. For example, visual feedback conveyed to the first given user a red illumination indicating that the first given user is positioned in a region that is in not tracked, unlocked and inactive state 94. Therefore to engage user interface 20, the first given user may be required to perform an unlock gesture.

In alternative embodiments, the techniques described above may be enhanced by incorporating features of an interaction surface, as described, for example, in the above-mentioned U.S. Pat. No. 8,166,421. In such embodiments, the computer may respond to user gestures and make the appropriate state transitions, for example, only after the user's hand has passed appropriately through the interaction surface.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for interactive control, comprising:
processing, by a computer executing a non-tactile three dimensional (3D) user interface, 3D coordinates of a hand positioned within a field of view of a sensing device coupled to the computer in order to detect gestures made by the hand;
in response to a first gesture detected by the computer, transitioning the 3D user interface from a first state in which the 3D user interface is disengaged to a second state in which the 3D user interface tracks but does not respond to the detected gestures;
in response to a second gesture detected by the computer, subsequent to the first gesture, transitioning the 3D user interface from the second state to a third state in which user control of the 3D user interface is engaged; and
in response to a third gesture detected by the computer, subsequent to the second gesture, accepting and executing a command indicated by the third gesture.

2. The method according to claim 1, wherein the first gesture comprises a first motion made by the hand in a first direction, while the second gesture comprises a second motion made by the hand in a second direction, different from the first direction.

3. The method according to claim 2, wherein the first motion is made in the first direction along a specified axis in space, and the second direction is opposite to the first direction along the specified axis.

4. The method according to claim 1, wherein each of the first and the second gestures comprises a motion of at least 10 centimeters performed at a speed of at least 10 centimeters per second.

5. The method according to claim 1, wherein in the second state the 3D user interface is locked, and wherein the second gesture unlocks the 3D user interface.

6. The method according to claim 5, wherein the second gesture comprises a specified unlock gesture, and wherein the 3D user interface in the second state ignores all gestures by the user other than the specified unlock gesture.

7. The method according to claim 1, wherein the first gesture comprises a focus gesture, which causes the 3D user interface to track and interpret subsequent gestures made by the hand.

8. The method according to claim 1, and comprising conveying a first visual feedback to the user prior to the first gesture, conveying a second visual feedback subsequent to the first gesture, and conveying a third visual feedback subsequent to the second gesture.

9. The method according to claim 1, wherein the first gesture comprises moving the hand from a first predefined region in space to a second predefined region, and wherein the second gesture comprises moving the hand from the second predefined region to a third predefined region.

10. The method according to claim 1, and comprising disengaging the 3D user interface in response to a fourth gesture detected by the computer, subsequent to the second gesture.

11. Apparatus for interactive control, comprising:
a sensing device, configured to output an indication of three dimensional (3D) coordinates of a hand positioned within a field of view of the sensing device; and
a computer configured to execute a non-tactile 3D user interface and to detect, based on the indication output by the sensing device gestures made by the hand, comprising at least first, second and third gestures,
wherein in response to the first gesture, the computer transitions the 3D user interface from a first state in which the 3D user interface is disengaged to a second state in which the 3D user interface tracks but does not respond to the detected gestures, and
in response to the second gesture detected by the computer, subsequent to the first gesture, the computer transitions the 3D user interface from the second state to a third state in which user control of the 3D user interface is engaged, and
in response to the third gesture detected by the computer, subsequent to the second gesture, the computer accepts and executes a command indicated by the third gesture.

12. The apparatus according to claim 11, wherein the first gesture comprises a first motion made by the hand in a first direction, while the second gesture comprises a second motion made by the hand in a second direction, different from the first direction.

13. The apparatus according to claim 11, wherein each of the first and the second gestures comprises a motion of at least 10 centimeters performed at a speed of at least 10 centimeters per second.

14. The apparatus according to claim 11, wherein in the second state the 3D user interface is locked, and wherein the second gesture unlocks the 3D user interface.

15. The apparatus according to claim 11, wherein the computer is configured to disengage the 3D user interface in response to a fourth gesture detected by the computer, subsequent to the second gesture.

* * * * *